United States Patent

Mayranen et al.

Patent Number: 5,513,535
Date of Patent: May 7, 1996

[54] METHOD AND DEVICE FOR MEASUREMENT OF THE FLOW VELOCITIES OF GASES AND/OR OF QUANTITIES THAT CAN BE DERIVED FROM SAME

[75] Inventors: Tarmo Mayranen; Sauli Koukkari, both of Muurame; ekka Hiismäki, Espoo; Matti Knuuttila, Espoo; Leif Kåll, Espoo; Antero Tiitta, Espoo, all of Finland

[73] Assignee: Instrumenttitehdas Kytola Oy, Muurame, Finland

[21] Appl. No.: 107,789

[22] PCT Filed: Nov. 12, 1992

[86] PCT No.: PCT/FI92/00307

§ 371 Date: Aug. 20, 1993

§ 102(e) Date: Aug. 20, 1993

[87] PCT Pub. No.: WO93/13390

PCT Pub. Date: Jul. 8, 1993

[30] Foreign Application Priority Data

Dec. 23, 1991 [FI] Finland ...................... 916102

[51] Int. Cl.⁶ ...................................................... G01F 1/00
[52] U.S. Cl. ...................................... 73/861.29; 73/861.25
[58] Field of Search .......................... 73/861.29, 861.28, 73/861.06, 861.04, 861.25

[56] References Cited

U.S. PATENT DOCUMENTS

| | | | |
|---|---|---|---|
| Re. 28,686 | 1/1976 | Coulthard | 73/861.06 |
| 2,826,912 | 3/1958 | Kritz | |
| 3,568,661 | 3/1971 | Franklin | |
| 3,819,919 | 6/1974 | McGunigle | 73/861.06 |
| 3,844,170 | 10/1974 | Critten | 73/861.06 |
| 4,019,038 | 4/1977 | Critten et al. | 73/861.06 |
| 4,312,238 | 1/1982 | Rey | |
| 4,787,252 | 11/1988 | Jacobson et al. | 73/861.28 |
| 4,975,645 | 12/1990 | Lucas | 73/862.04 |
| 5,220,923 | 6/1993 | Hagiwara et al. | 73/861.25 |
| 5,226,328 | 7/1993 | Petroff et al. | 73/861.25 |

FOREIGN PATENT DOCUMENTS

| 76885 | 8/1988 | Finland . | |
|---|---|---|---|
| 790119 | 12/1979 | WIPO | 73/861.06 |

OTHER PUBLICATIONS

"Ultrasonic cross–correlation flowmeters," *Ultrasonics* (Mar., 1973), by Coulthard, J.

Primary Examiner—Richard Chilcot
Assistant Examiner—Ronald L. Biegel
Attorney, Agent, or Firm—Jones & Askew

[57] ABSTRACT

Method and device of acoustic flow measurement for measurement of the flow velocities of gases and/or of quantities that can be derived from same. Long-wave sound is transmitted into a measurement pipe (10). The sound signals passing in the gas flow downstream and upstream are detected by means of two sound detectors (14a, 14b) placed in connection with the measurement pipe (10) at a specified distance (L) from one another, the flow velocity (v) of the gas that flows in the measurement pipe (10) being determined by making use of polarity correlation ($15; 15_1, 15_2$) of said signals. The frequency of the sound that is transmitted into the measurement pipe (10) is scanned between a certain minimum and maximum frequency ($f_{min}, \ldots f_{max}$). The measurement signals ($f_a(t), f_b(t)$) arriving from the two sound detectors (14a, 14b) are passed to a narrow-band filter (17a, 17b) or system of filters ($17a_1, 17a_2, 17b_1, 17b_2$). The passband of said filters (17) is scanned synchronously with the frequency scanning of the sound transmission. The duration of the frequency scanning and the width of the passband of said filters (17) are chosen so that, at the moment of the measurement sequence, the measurement signal detected by each sound detector (14a, 14b) has access through its filter (17) substantially without attenuation, as well as so that the interference frequencies substantially different from the mean frequency ($f_0$) of the filters (17) are attenuated significantly.

12 Claims, 2 Drawing Sheets

METHOD AND DEVICE FOR MEASUREMENT OF THE FLOW VELOCITIES OF GASES AND/OR OF QUANTITIES THAT CAN BE DERIVED FROM SAME

The invention concerns a method of acoustic flow measurement for measurement of the flow velocities of gases and/or of quantities that can be derived from same, in which method long-wave sound is transmitted into a measurement pipe and the sound signals passing in the gas flow downstream and upstream are detected by means of two sound detectors placed in connection with the measurement pipe at a specified distance from one another, the flow velocity of the gas that flows in the measurement pipe being determined by making use of polarity correlation of said signals, and in which method the frequency of the sound that is transmitted into the measurement pipe is scanned between a certain minimum and maximum frequency.

Further, the invention concerns a device for measurement of the flow velocities of gases and/or of quantities that can be derived from same, such as volumetric flow and/or mass flow, which device comprises a measurement pipe, in which the gas flow to be measured runs, which device comprises loudspeakers as the transmitters of the sound signals and microphones as the sound detectors, which microphones are placed in connection with the measurement pipe between said loudspeakers at a certain known distance from one another, which device comprises a frequency-scanned signal generator or generators, by whose means frequency-scanned electric signals are fed to said loudspeakers, and which device comprises a polarity correlator, into which the signals received from said microphones are fed.

From the FI Patent No. 76,885 of the Technical Research Centre of Finland (Valion tutkimuskeskus VTT), a method and a device of acoustic flow measurement are known for measurement of the flow velocities, volumetric flows, and/or mass flows of gases, liquids, and/or multi-phase suspensions in a pipe or in an equivalent wave tube by making use of acoustic waves passing downstream and upstream. In this prior-an method and device, the wide-band acoustic signal coming from the sound sources is made to pass in the measurement pipe or equivalent wave tube in the plane-wave mode both downstream and upstream, and the flow velocity is determined on the basis of the sound travel times obtained from the maxima and/or the minima of the correlation functions of the measured sound signals and on the basis of the mutual distance between the measurement points.

In one technical solution described in said FI patent, the sound is fed into the measurement pipe in the form of frequency scanning, and the travel time of sound is determined from the signals of the microphones placed at the ends of the measurement distance by means of a polarity correlator. From the travel times measured downstream and upstream, it is possible to measure both the average flow velocity and the sound speed in a medium at rest with high accuracy. Moreover, if necessary, from the flow velocity and from the cross-sectional area of the pipe, it is possible to calculate the volumetric flow rate, and from that further the mass flow rate by combining the results of pressure and temperature measurements.

Practical experiments have established that the method and the device of said FI patent operate in the desired way provided that the sound level of the frequency scanning signals transmitted into the pipe is at least of the same level as the interference noise occurring in the pipe. In the presence of a strong background noise, the desired sound signal is superposed on the signal produced by the noise, in which case the state of the comparator circuit present at the input of the polarity correlator cannot be varied in the desired way, which phenomenon will be described in more detail later with reference to the accompanying FIG. 3. Besides the noise in the environment, the connections of the microphones and the loudspeakers needed in the measurement method and device to the measurement pipe produce turbulence in the gas flow, which, as is well known, produces a noise of a relatively wide spectrum. Also, other discontinuities in the flow duct, such as valves, flow throttles, or pipe elbows, may cause noise-producing turbulence in the flow. Occasionally, the noise produced by the flow itself may include discrete frequencies of even very high powers. Noise that interferes with the acoustic flow measurement system may also be conducted into the system along the walls and the support constructions of the flow pipe. For example, the security standards of natural gas prevent raising of the input power of sound to a level adequate under all circumstances. This is why attempts must be made to raise the signal-to-noise ratio in the acoustic measurement system in some other way.

In the method described in said FI patent, the sound signals passing downstream and upstream also tend to disturb each other, i.e., in relation to one another, they are comparable with the noise in the measurement environment. This is why the sound signals must be transmitted alternatingly downstream and upstream, which, however, produces errors of measurement in rapidly varying flows.

The object of the present invention is further development of the method and device of flow measurement described in said FI Patent 76,885 so that the drawbacks discussed above are substantially avoided.

It is a particular object of the invention to provide a method that is better suitable for use in noisy environments of measurement, such as, typically, for example, measurement of natural gas.

In view of achieving the objectives stated above and those that will come out later, the method of the invention is mainly characterized in that the measurement signals arriving from the two sound detectors are passed to a narrow-band filter or system of filters, that the passband of said filters is scanned synchronously with the frequency scanning of the sound transmission, and that the duration of the frequency scanning and the width of the passband of said filters have been chosen so that, at the moment of the measurement sequence, the measurement signal detected by each sound detector has access through its filter substantially without attenuation, as well as so that the interference frequencies substantially different from the mean frequency of the filters are attenuated significantly.

On the other hand, the device in accordance with the invention is mainly characterized in that the device comprises two frequency-scanned filters or an equivalent system of filters, through which the signals coming from said microphones are fed to said polarity correlator, and that the device comprises a control of the frequency scanning, by whose means the frequency of the frequency-scanning signal generator and the frequency scanning of said narrow-band filters are controlled synchronously with one another.

In the present invention, it is suggested that a polarity correlate, which is in itself advantageous and represents a simple embodiment, is usable in the presence of a far stronger background noise, as compared with prior art, when each microphone signal is first passed to a narrow-band filter, whose band follows the frequency scanning of the transmitted signal. In such a case, it is required that the filters have a time delay independent from the frequency, such as, for example, in the case of FIR-filters. The band scanning of a FIR-filter can be accomplished most simply by changing the clock frequency, in which case the time delay caused by the filter is, however, changed as inversely proportional to the clock frequency. This is, however, not detrimental, for only a difference between the time delays of the two filters would affect the measurement result, but that difference remains zero. In practice, the frequency scanning must be chosen so slow that, in spite of their time delays, the signals of both of the microphones have access through the identical narrow-band filters without substantial attenuation, whereas the other frequencies, which differ from the mean frequency of the filters to a greater extent, are attenuated significantly. This is accomplished best if the mean frequency of the passband of the filters is in each particular case equivalent to the frequency of the signal that would be measured halfway in the distance of measurement, equally far from each microphone.

The use of a scannable filter also increases the usability of a polarity correlator in other ways. Without a scannable filter used in the present invention, the sound signals transmitted downstream and upstream may disturb each other to such an extent that they must be transmitted alternatingly, which may, as was stated above, produce an error when the flow velocity varies rapidly. In the invention, by means of scannable narrow-band filters, even a sound passing simultaneously downstream and upstream can be separated from one another when the difference in frequency is arranged large enough. In such a case, preferably four scannable filters are used.

In the following, the invention will be described in detail with reference to some exemplifying embodiments of the invention illustrated in the figures in the accompanying drawing as well as with reference to the diagrams illustrating the invention and its background.

Figure 3A:
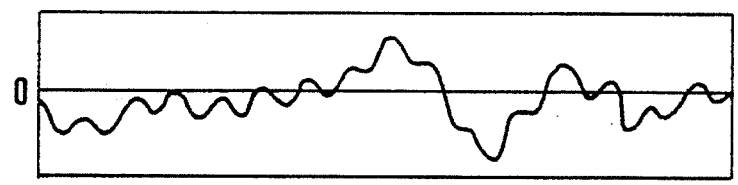
Figure 3B:
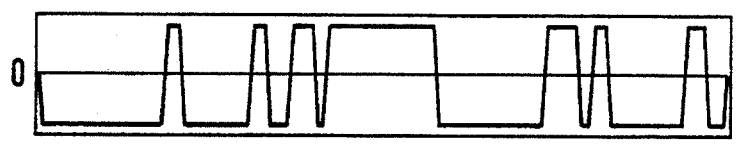
Figure 3C:
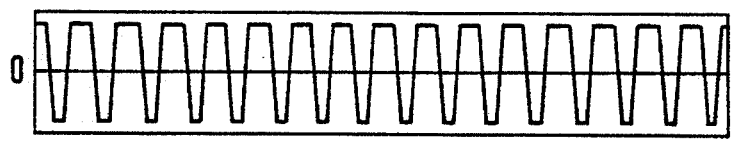

FIG. 3 A) illustrates a measurement signal mixed with noise in an amplitude-time system of coordinates, FIG. 3 B) illustrates an indication of the polarity of said signal without filtering, and FIG. 3 C) with filtering in accordance with the present invention.

Figure 4:
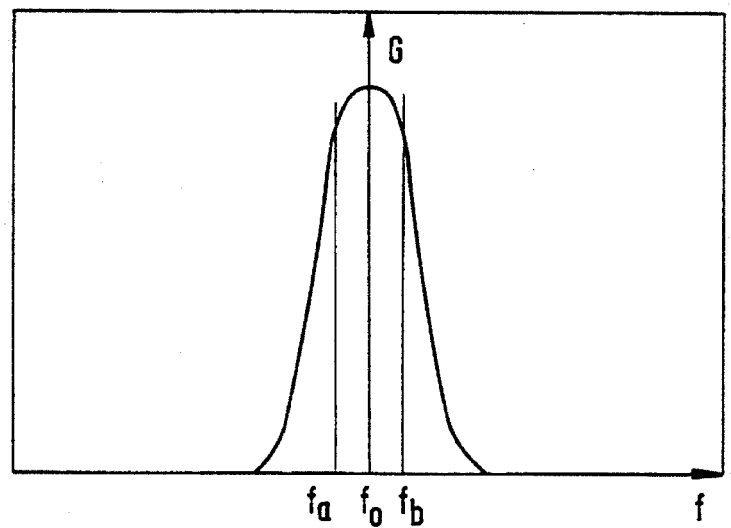

FIG. 4 illustrates the passband of a narrow-band filter applied in the invention.

Figure 5:
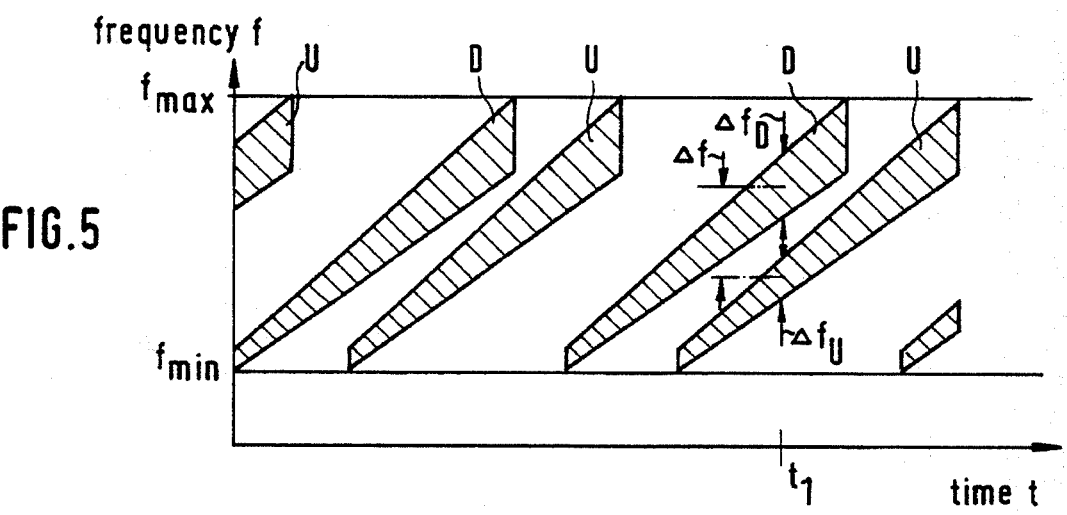

FIG. 5 illustrates the passbands of scannable filters that measure downstream and upstream.

Figure 1:
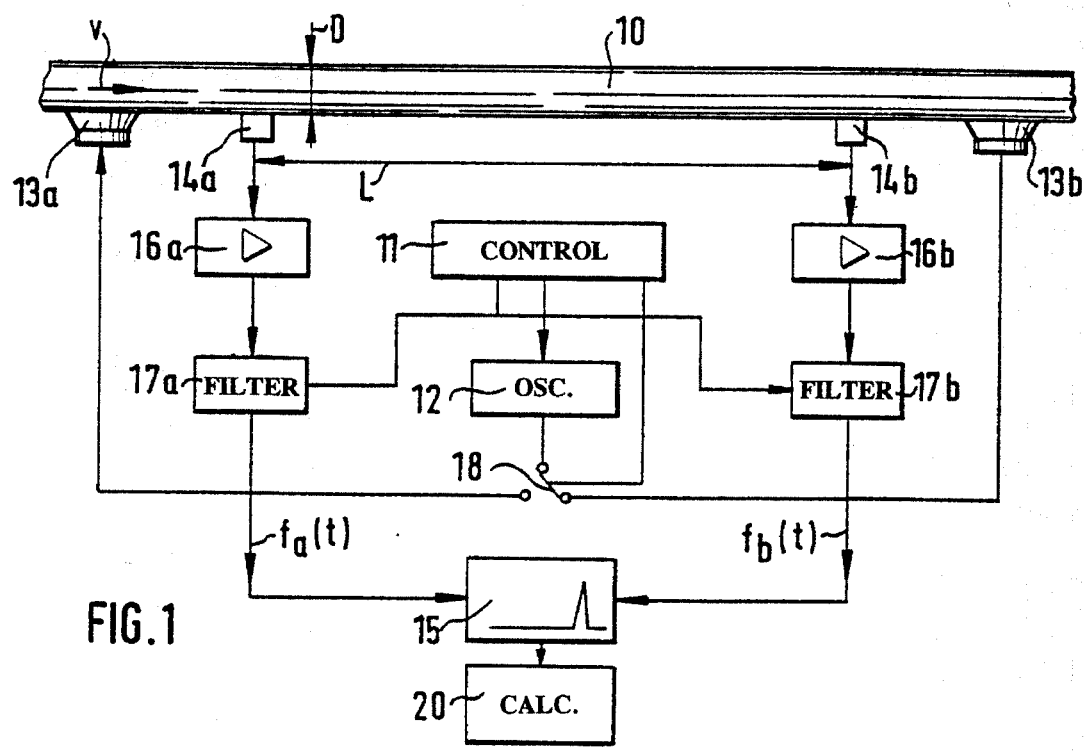
FIG. 1 is a schematic block diagram illustration of an acoustic flowmeter in accordance with the invention which is based on sound-speed measurement taking place alternatingly downstream and upstream.
Figure 2:
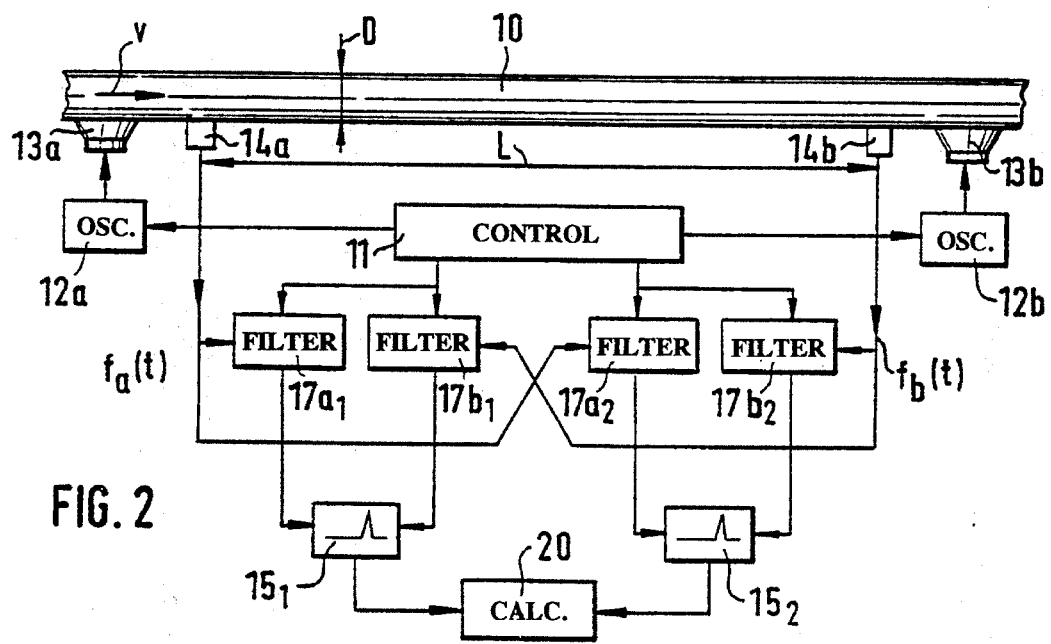
FIG. 2 is an illustration corresponding to FIG. 1 of a flowmeter in accordance with the invention which is based on sound-speed measurement taking place simultaneously downstream and upstream.

According to FIGS. 1 and 2, the gas flow whose flow velocity v is measured acoustically runs in a pipe 10. Typically, the gas to be measured is natural gas. Into the measurement pipe 10, sound signals are transmitted by means of loudspeakers 13a and 13b downstream and upstream, which signals are received by means of microphones 14a and 14b placed between the loudspeakers 13a and 13b, the mutual distance L between the microphones being essential for the flow measurement. The diameter D of the measurement pipe 10 and the measurement distance L are chosen, for example, so that L≈10D.

From the point of view of the measurement technology related to the invention, it is the most essential physical observation that in a pipe 10 with rigid walls, below a certain limit frequency which depends on the dimensions of the pipe 10, exclusively a so-called plane-wave mode or piston mode can proceed, whose speed of progress does not depend on local variations in the medium, in its temperature or flow velocity, but exclusively on the average values prevailing within the measurement distance (B. Robertson, "Effect of Arbitrary Temperature and Flow Profiles on the Speed of Sound in a Pipe", J. Acoust. Soc. Am., Vol 62, No. 4, p. 813 . . . 818, October 1977, and B. Robertson, "Flow and Temperature Profile Independence of Flow Measurements Using Long Acoustic Waves", Transactions of the ASME, Vol. 106, p. 18 . . . 20, March 1984), which permits accurate flow measurement independent from the profile. For a pipe of circular section, said limit frequency $f_c$ can be calculated from the formula $$f_c = c/(1.7 \cdot D), \quad (1)$$

wherein c is the travel speed of sound in the medium that fills the pipe, and D is the diameter of the pipe 10.

In the following, the formulae of calculation used in the flow measurement in accordance with the invention will be given.

$$\text{Flow velocity [m/s]} \quad v = 0.5 \cdot L \cdot (t_1^{-1} - t_2^{-1}) \quad (2)$$

$$\text{Volumetric flow [cu.m/s]} \quad Q = v \cdot A \quad (3)$$

$$\text{Mass flow [kg/s]} \quad M = Q \cdot \rho \quad (4)$$

v=average flow velocity
L=distance between microphones 14a and 14b
$t_1$=travel time of sound downstream
$t_2$=travel time of sound upstream
Q=volumetric flow
A=cross-sectional area of the pipe 10
M=mass flow
ρ=density of gas According to FIG. 1, the loudspeakers 13a and 13b are fed alternatingly with electric signals received from the scanning generator 12. The alternation of the feed of the loudspeakers 13a and 13b is controlled by means of a switch 18 controlled by the control unit 11 of frequency scanning. The receiving side of the acoustic measurement system comprises the above microphones 14a and 14b, placed at the measurement distance L from one another, the output signal of said microphones being fed, by the intermediate of the amplifiers 16a and 16b, to the scannable filters 17a and 17b, which are essential components in the present invention and whose scanning band is controlled by the control unit 11 of frequency scanning. Said scannable filters 17a and 17b are connected to the polarity correlator 15.

One input signal, $f_a(t)$, of the polarity correlator 15 applied in the invention is in real time, and the other one, $f_b(t-\tau)$ is delayed by means of a transfer register. The word "polarity" means that, if the functions $f_a$ and $f_b$ are continuous, their value is determined at the precision of one bit only, i.e., it is decided whether the function is positive or negative in comparison with a predetermined "zero" reference level. If the possible values of the signals are +1 (positive) and −1 (negative), the normalized correlation function can be determined from the formula $$R_{a,b}(\tau)_0^T = 1/T \int \frac{1}{2} (f_a(t) f_b(t-\tau) + 1) dt. \quad (5)$$

When there is a strong positive correlation between the signals $f_a(t)$ and $f_b(t)$, the function $R_{a,b}$ obtains a value close to 1, and with a strong negative correlation, the value is close to zero. When there is no correlation, the value 0.5 is obtained.

If a positive value of the signal $f_a$ or $f_b$ is determined as the logical value 1, while a negative value corresponds to the logical 0, the logical function that receives equally large values as an integrand $$I(t,\tau)=\tfrac{1}{2}(f_a(T)f_b(t-\tau)+1) \quad (6)$$

can be carried into effect by means of an exclusive NOR-gate.

The polarity correlator 15 takes samples from the integrand, equation (6), at a certain time interval of the time delay τ. The integration is carried out by summing the sampling results in calculators with the measurement sequence time T. Each individual value τ, which is called channel, has a calculator of its own. The maximal sampling frequency may be equal to the clock frequency of the transfer register.

One exemplifying embodiment of a polarity correlator is illustrated in detail in FIGS. 5 and 6 in the applicant's said FI Patent No. 76,885, reference being made to said figures in respect of the embodiment of the polarity correlator 15;15$_1$, 15$_2$. From the polarity correlator 15;15$_1$,15$_2$, a measurement signal is fed to the unit 20, which includes, e.g., a computer, which calculates, on the basis of the formulae (2), (3), or (4) given above, the flow velocity (v) to be measured and, if necessary, the volumetric flow (Q) or the mass flow (M) to be measured. The unit 20 also includes computer output or display means for the measurement results.

According to the present invention, the passband of the narrow-band filters 17a and 17b follows the frequency scanning of the scanning generator 12 on the basis of the control by the unit 11. The filters 17a and 17b are arranged so that they have a time delay independent from the frequency. For this purpose, the filters are preferably FIR (Finite Impulse Response) filters, whose band scanning is carried out most simply by changing the clock frequency. However, in such a case, the time delay produced by the FIR-filter is chanted as an inversely proportional clock frequency, which is, however, not detrimental, for it is only the difference between the time delays of the two filters that affects the measurement result, but that remains zero. The frequency range $f_{min} \ldots f_{max}$ of the frequency scanning is chosen, e.g., in the range of 0.1 ... 10 kHz. Moreover, in practice, the frequency scanning must be chosen slow enough so that, in spite of their time delay, the signal of each microphone 14a, 14b can pass through the narrow-band filters 17a, 17b, which are identical with one another, without substantial attenuation, whereas the other frequencies, which differ from the mean frequency of the filters to a greater extent, are attenuated to a significant extent, as comes out from FIG. 4. This is accomplished most advantageously so that, in each particular case, the mean frequency $f_0$ of the filters 17a and 17b corresponds to the frequency of the signal that would be measured halfway on the measurement distance, equally far from the two microphones 14a, 14b.

In FIG. 3, in which the vertical axis represents the amplitudes of the signals and the horizontal axis represents the time, the effect of interfering noise in the measurement pipe 10 on the indication of the polarity of the measurement signal is illustrated. In FIG. 3A), a substantially sine-formed measurement signal is shown, which has been superposed onto a noise signal of a frequency substantially lower than that of the measurement frequency. FIG. 3 B) shows an indication of the signal polarity produced without filtering in accordance with the present invention, and FIG. 3 C) shows a corresponding indication of polarity produced with filtering in accordance with the present invention.

FIG. 4 illustrates the principle of the selection of the frequency band of the narrow-band filters 17a and 17b. The vertical axis G represents the bandpass of the filters 17a, 17b, and the horizontal axis represents the frequency f. Attempts are made to place the momentary frequencies $f_a$ and $f_b$ detected by the intermediate of the microphones 14a, 14b in the passband of the filters 17a, 17b symmetrically at both sides of the mean frequency $f_0$.

The sound signals, which are transmitted downstream and upstream in accordance with FIG. 1, are transmitted alternatingly. This may produce an error of measurement when the flow velocity is changed more rapidly than the duration of the measurement sequence. An application of scannable filters in accordance with the invention also permits elimination of this drawback, e.g., by means of a measurement arrangement as shown in FIG. 2. According to FIG. 2, four scannable filters 17a$_1$,17a$_2$ and 17b$_1$, 17b$_2$ and two polarity correlators 15$_1$ and 15$_2$ are employed. Of the scannable filters 17, the filters 17a$_1$ and 17a$_2$ are connected to the detector microphone 14a. Of the scannable filters, the filters 17b$_1$ and 17b$_2$ are connected to the other detector microphone 14b. The filters 17a$_1$ and 17b$_1$ are connected to the polarity correlator 15$_1$, and, in a corresponding way, the filters 17a$_2$ and 17b$_2$ are connected to the other polarity correlator 15$_2$. The filters 17a$_1$ and 17b$_1$, which are connected to follow the frequency scanning transmitted downstream, are identical with one another, and so are the filters 17a$_2$ and 17b$_2$, which are controlled to follow the scanning transmitted upstream, identical with one another. The momentary frequencies of the frequency scannings transmitted downstream and upstream are preferably all the time to such an extent different from one another that only the correct sound has access through each filter without substantial attenuation. The simplest way is to use the same frequency scanning in both directions so that one of them is delayed with respect to the other to a sufficient extent in order that the passbands of the filters 17 should not overlap each other even partly. The above means that, in stead of the two scanning generators 12a and 12b shown in FIG. 2, only one generator 12 is employed, the electric signal being fed into one of the loudspeakers through a time delay circuit in itself known. This arrangement is illustrated in FIG. 5 by the passbands of the filters 17 illustrated on the frequency-time scale by means of diagonal shading. In FIG. 5, D refers to the passbands of the filters 17 that measure downstream, and U refers to the passbands of the filters 17 that measure upstream, which passbands have been separated from each other completely by delaying the transmitted frequency scannings sufficiently with respect to one another. The maximum frequency of the frequency scanning is denoted with $f_{max}$, and the minimum frequency with $f_{min}$. According to FIG. 5, for example, the frequency band of a filter that measures downstream at the time $t_1$ is $\Delta f_D$, and the passband of a filter 17 that measures upstream is $\Delta f_U$, and the interval between the mean frequencies $f_0$ of said bands is $\Delta f$.

In the following, the patent claims will be given, and the various details of the invention may show variation within the scope of the inventive idea defined in said claims and differ from the details given above for the sake of example only.

We claim:

1. Method of acoustic flow measurement for measurement of the flow velocities of gases through a measurement pipe (10), comprising the steps of:

transmitting acoustic signals into the measurement pipe (10) upstream and downstream of the gas flow;

detecting the acoustic signals propagating in the gas flow downstream and upstream by means of two sound detectors (14a, 14b) placed in acoustic connection with the measurement pipe (10) at a specified distance (L) from one another;

determining the flow velocity (v) of the gas that flows in the measurement pipe (10) by making use of polarity correlation (15; $15_2 15_2$) of said signals;

varying the frequency of the acoustic signals that are transmitted into the measurement pipe (10) between a certain minimum and maximum frequency ($f_{min} \cdots f_{max}$);

passing the measurement signals ($f_a(t)$, $f_b(t)$) arriving from the two acoustic detectors (14a, 14b) to narrow-band filters (17a, 17b);

scanning the passband of said filters (17) synchronously with the frequency variation of the acoustic signal transmission; and choosing the duration of the frequency variation and the width of the passband of said filters (17) so that, at the moment of the measurement sequence, the measurement signal detected by each sound detector (14a, 14b) passes through one of said filters (17) substantially without attenuation, and so that interference frequencies substantially different from a mean frequency ($f_0$) of the filters (17) are substantially attenuated.

2. Method as claimed in claim 1, characterized in that said filters (17) are chosen so that the signal travel time delay caused by them is, at each mean frequency ($f_0$) of the filter, independent from the frequency.

3. Method as claimed in claim 1, characterized in that the momentary frequencies ($f_a$, $f_b$) of the signals arising from the time difference of the signals of the acoustic detector (14a, 14b) are placed substantially symmetrically at both sides of the mean frequency ($f_0$) of the passband (FIG. 4).

4. Method as claimed in claim 1, characterized in that the frequency-varied acoustic signals are transmitted alternatingly downstream and upstream by switching a signal frequency generator alternatingly to a downstream transmitter (13a) and to an upstream transmitter (13b), respectively.

5. Method as claimed in claim 1, in particular for measurement of a rapidly varying gas flow, characterized in that frequency scannings of separate bands are transmitted simultaneously downstream and upstream, that two parallel filter systems ($17a_1$, $17a_2$;; $17b_1$, $17b_2$) are employed, of which one ($17a_1$, $17a_2$) is tuned to follow the frequency scanning transmitted downstream and the other one ($17b_1$, $17b_2$) is tuned to follow the frequency scanning transmitted upstream, the momentary frequencies of said scannings being arranged to differ from one another to a sufficient extent so that each filter system passes only the scanning through it that it has been tuned to follow (FIG. 2).

6. Method as claimed in claim 1, characterized in that the frequency-scanned filters (17) that are used are finite impulse response filters, and that the band scanning of the filters (17) is carried out by changing their clock frequency.

7. Device for measurement of the flow velocities (v) of gases, which device comprises:

a measurement pipe (10), in which the gas flow to be measured runs;

acoustic emitters (13a, 13b) operative to transmit acoustic signals into the pipe;

receivers (14a, 14b) placed in acoustic connection with the measurement pipe (10) between said acoustic emitters (13a, 13b) at a certain known distance (L) from one another;

at least one frequency-scanned signal generator (12, operative to feed frequency-scanned measurement signals to said acoustic emitters (13a, 13b);

a polarity correlator (15; $15_1$, $15_2$) operative to receive the signals received from said receivers (14a, 14b);

at least two frequency-scanned narrow-band filters (17a, 17b) through which the signals coming from said receivers (14a, 14b) are fed to said polarity correlator (15; 15a, 15b); and frequency scanning control means operative to control the frequency of the frequency-scanning signal generator (12) and the frequency scanning of said narrow-band filters (17) synchronously with one another, so that only the measurement signals received by the receivers pass through the filter without substantial attenuation.

8. Device as claimed in claim 7, characterized in that the device comprises one frequency-scanning generator (12), which is controlled to be switched alternatingly to the different loudspeakers (13a, 13b).

9. Device as claimed in claim 7, characterized in that the device comprises two separate frequency-scanning generators (12a, 12b), by whose means sound signals of different frequencies are fed simultaneously into both of the loudspeakers (13a, 13b) (FIG. 2).

10. Device as claimed in claim 9, characterized in that the device further comprises two pairs of frequency-scannable filters ($17a_1$, $17a_2$, $17b_1$, $17b_2$), one pair ($17a_1$, $17a_2$) being operative synchronously with the frequency scanning transmitted downstream and the other pair ($17b_1$, $17b_2$) being operative synchronously with the frequency scanning transmitted upstream, such that the difference ($\Delta f$) between the instantaneous frequencies of the frequency scannings of said filter pairs is large enough so that said received measurement signal has access through each filter without substantial attenuation.

11. Device as claimed in claim 10, characterized in that frequency scanning generators and frequency-scannable filters use the same frequency scanning both downstream and upstream, one of the frequency scannings is delayed with respect to the other so that the passbands ($\Delta f_D, \Delta f_U$) of the filters (17) do not even partly overlap each other at the same time (FIG. 5).

12. Method as claimed in claim 2, characterized in that the frequencies ($f_a$, $f_b$) of the signals arising from the time difference of the signals of the sound detector (14a, 14b) are placed substantially symmetrically at both sides of the mean frequency ($f_0$) of the passband (FIG. 4).

* * * * *